United States Patent Office 3,121,089
Patented Feb. 11, 1964

3,121,089
2-ARYLSULFONAMIDO-5-ALKYL-1,3,4-THIADIAZOLE
Nils Åke Jönsson, Sodertalje, Sweden, assignor to Aktiebolaget Astra, Apotekarnes Kemiska Fabriker, Sodertalje, Sweden, a company of Sweden
No Drawing. Filed Feb. 19, 1958, Ser. No. 715,999
Claims priority, application Sweden Feb. 21, 1957
6 Claims. (Cl. 260—306.8)

It is known through a number of publications that diabetes in humans in many cases may be advantageously treated by oral administration of certain substituted benzene sulfonyl ureas. Particularly the compound N'-sulfanilyl-N''-(n-butyl) urea (Belgian Patent No. 548,734) has been closely examined; see for instance Bertram et al., Deutsche Med. Wschr. 80, 1945 (1955).

It is a disadvantage with this and related compounds that due to their sulfanilamide character, they exert an antibacterial activity with the accompanying great risk of producing resistant bacterial strains in the treated patient. Moreover, it is a well-known fact that sulfanilamide compounds may cause drug allergies and also present the risk of producing concretions in the kidneys with accompanying annoying consequences.

It has now been found that these disadvantages can be avoided or reduced to a high degree by using for oral administration compounds of the type:

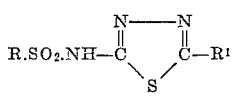

where R represents a phenyl group which is substituted with a radical selected from the group: lower alkyl and lower alkoxy, and $R^1$ represents a lower alkyl group containing at least 3 carbon atoms.

The new compounds may be prepared for instance by reacting a substituted benzenesulfonyl halide with a suitable aminothiadiazole, whereby the benzene nucleus not necessarily must originally contain the desired substituent or substituents but may also contain atoms or substituent groups which may be converted into these substituents. The compounds prepared may then, if desired, be converted into salts in a manner known per se. The invention includes also these salts.

Compounds of this type have a strong hypoglycaemic activity, but do not possess any bactericidal or bacteriostatic activity, and due to their high solubility the risk of formation of concretions in the kidneys is exceedingly small and no allergic side effects have been observed during clinical use.

The invention is illustrated, but not restricted, by the following examples:

EXAMPLE 1

*2-(p-Toluenesulfonylamido)-5-Isobutyl-1,3,4-Thiadiazole*

To a solution of 2-amino-5-isobutyl-1,3,4-thiadiazole (15.7 g.) in acetone (100 ml.), p-toluenesulfonyl chloride (19.0 g.) dissolved in the necessary amount of acetone is added drop by drop at 20–25° C. Sodium hydroxide (4 g.) dissolved in water (25 ml.) is then added drop by drop at the same temperature. The mixture is stirred at 20–25° for 4 hours, diluted with water and acidified with diluted hydrochloric acid whereby 2-(p-toluenesulfonylamido)-5-isobutyl-1,3,4-thiadiazole is precipitated. The product is collected and crystallized from methanol.

EXAMPLE 2

*2-(p-Toluenesulfonylamido)-5-Isobutyl-1,3,4-Thiadiazole* p-Toluenesulfonyl chloride (19.0 g.), 2-amino-5-isobutyl-thiadiazole (15.7 g.) and pyridine (75 ml.) are mixed and left standing for 4 hours with occasional shaking. The reaction mixture is poured into 4 N hydrochloric acid (500 ml.) whereby an oil separates and soon crystallizes. Recrystallization from methanol gives 2-(p-toluenesulfonylamido)-5-isobutyl-1,3,4-thiadiazole.

By reacting 5-n-butyl-, 5-isobutyl-, 5-n-amyl- (melting point 195.5–196.5° C.) and 5-n-heptyl-2-amino-1,3,4-thiadiazole (melting point 195–196° C.) with a suitable sulfonyl chloride in pyridine the compounds listed in Table 1 have been prepared.

TABLE 1

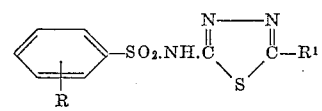

| R | $R^1$ | M.P., °C. |
|---|---|---|
| p-CH₃O | n-propyl | 126.5–127.5 |
| p-C₂H₅O | do | 124.5–125.5 |
| p-C₂H₅O | n-butyl | 113–114 |
| m-CH₃ | do | 127.5–129 |
| p-CH₃ | iso-butyl | 172–173.5 |
| p-CH₃O | do | 147.5–148.5 |
| p-CH₃O | n-amyl | 133.5–134.5 |
| O-CH₃ | do | 185–186 |
| p-CH₃O | n-heptyl | 123.5–126 |

What is claimed is:
1. A member of the class consisting of (a) a compound having the formula

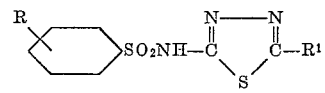

where R is a radical selected from the group consisting of lower alkyl and lower alkoxy; and $R^1$ represents a lower alkyl group containing at least three carbon atoms; and (b) a therapeutically innocuous acid addition salt of Compound a.
2. 2-(para-methoxyphenylsulfonamido)-5-isobutyl-thiadiazole.
3. 2-(para-methoxyphenylsulfonamide)-5-n-propyl-thiadiazole.
4. 2-(para-methylphenylsulfonamido)-5-isobutyl-thiadiazole.
5. 2-(para-ethoxyphenylsulfonamido)-5-n-butyl-thiadiazole.
6. 2-(para-methoxyphenylsulfonamido)-5-n-amyl-thiadiazole.

References Cited in the file of this patent
UNITED STATES PATENTS

| 2,447,702 | Hubner | Aug. 24, 1948 |
| 2,476,655 | Fox et al. | July 19, 1949 |
| 2,525,320 | Hultquist et al. | Oct. 10, 1950 |
| 2,542,856 | Wright et al. | Feb. 20, 1951 |

FOREIGN PATENTS

| 505,112 | Canada | Aug. 17, 1954 |